(12) United States Patent
Laurent et al.

(10) Patent No.: US 11,872,726 B2
(45) Date of Patent: Jan. 16, 2024

(54) TIRE SEGMENT MODEL AND A METHOD OF MAKING A TIRE MOLD SEGMENT

(71) Applicant: The Goodyear Tire & Rubber Company, Akron, OH (US)

(72) Inventors: David Charles Jacques Robert Laurent, Tilff (BE); Jean-Philippe Aloyse Henri Sander, Entrange (FR); Antoine Francois Regnier, Attert (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 178 days.

(21) Appl. No.: 17/079,650

(22) Filed: Oct. 26, 2020

(65) Prior Publication Data

US 2021/0138691 A1    May 13, 2021

Related U.S. Application Data

(60) Provisional application No. 62/932,081, filed on Nov. 7, 2019.

(51) Int. Cl.
  *B29D 30/06* (2006.01)
  *B29C 33/38* (2006.01)
  (Continued)

(52) U.S. Cl.
  CPC ...... *B29C 33/3842* (2013.01); *B29D 30/0606* (2013.01); *B33Y 10/00* (2014.12);
  (Continued)

(58) Field of Classification Search
  CPC ..... B60C 11/0008; B60C 11/03; B60C 11/12; B60C 11/13; B29D 2030/0613; B29D 30/02; B29D 30/54; B33Y 80/00; B33Y 30/00; B29C 64/10; B29C 64/106; B29C 64/112; B29C 64/118; B29C 64/20; B29C 64/205; B29C 64/209; B29C 64/227;
  (Continued)

(56) References Cited

U.S. PATENT DOCUMENTS 3,415,923 A    12/1968  Petersen
5,449,483 A     9/1995  Greenwood et al.
(Continued)

FOREIGN PATENT DOCUMENTS

CA      826575 A    11/1969
CN     1921995 A     2/2007
(Continued)

OTHER PUBLICATIONS

Patent Translate, "Description DE-102018214407-A1", Oct. 4, 2022, EPO and Google. (Year: 2022).*
(Continued)

*Primary Examiner* — James Sanders
(74) *Attorney, Agent, or Firm* — Alvin T. Rockhill

(57) ABSTRACT

The present invention is directed to a 3D-printed tire segment model having a tread portion comprising a plurality of grooves, ribs and/or tread blocks, and a plurality of blades extending out of the ribs and/or tread blocks, wherein the tire segment model is made of a 3D-printed polymer. Moreover, the present invention is drawn to a method of making a tire mold segment, including the step of 3D-printing the above tire segment model with a polymer.

17 Claims, 3 Drawing Sheets

(51) Int. Cl.
*B33Y 10/00* (2015.01)
*B33Y 80/00* (2015.01)

(52) U.S. Cl.
CPC ...... *B33Y 80/00* (2014.12); *B29D 2030/0613* (2013.01); *B29K 2905/02* (2013.01); *B29K 2905/12* (2013.01)

(58) Field of Classification Search
CPC ... B29C 64/232; B29C 64/236; B29C 64/241; B29C 64/245; B29C 64/25; B29C 64/295; B29C 64/30; B29C 64/386; B29C 64/393; B29C 64/00; B29C 64/188; B29C 64/379; B29C 2037/80; B29C 73/00; B29C 73/10
USPC ................. 152/208; 264/308, 317; 425/375
See application file for complete search history.

(56) References Cited

U.S. PATENT DOCUMENTS

| | | | | |
|---|---|---|---|---|
| 2007/0152362 | A1* | 7/2007 | Greenwell | B29D 30/0601 264/347 |
| 2007/0168066 | A1* | 7/2007 | Grishaber | G09B 23/30 700/98 |
| 2008/0185085 | A1* | 8/2008 | Ohashi | B60C 11/1218 152/209.23 |
| 2013/0059142 | A1* | 3/2013 | Chung | B60C 1/0008 264/129 |
| 2014/0264294 | A1* | 9/2014 | Holman | B29C 64/112 425/375 |
| 2014/0265033 | A1* | 9/2014 | Woloszyn | B29C 64/112 264/401 |
| 2014/0353862 | A1* | 12/2014 | Erdman | B29C 64/295 425/17 |
| 2015/0174954 | A1* | 6/2015 | Asper | B29D 30/02 152/5 |
| 2016/0185040 | A1* | 6/2016 | Costlow | B29C 64/209 264/40.5 |
| 2017/0368606 | A1* | 12/2017 | Blanchet | B29C 64/153 |

FOREIGN PATENT DOCUMENTS

| | | | |
|---|---|---|---|
| CN | 107073822 A | 8/2017 | |
| DE | 102018214407 A1 * | 2/2020 | ............ B29D 30/54 |
| EP | 1184105 A2 | 3/2002 | |
| EP | 1719598 A1 | 11/2006 | |
| EP | 3219468 B1 | 9/2020 | |
| GB | 2085612 A | 4/1982 | |
| WO | 2010096072 A1 | 8/2010 | |

OTHER PUBLICATIONS

Extended European Search Report dated Mar. 29, 2021 for European Patent Application No. 20204690.0 which is the European counterpart to the subject patent application.

Translation of Chinese Search Report dated Mar. 15, 2022 for Chinese Patent Application No. 202011231317.8 which is the Chinese counterpart to the subject patent application.

* cited by examiner

TIRE SEGMENT MODEL AND A METHOD OF MAKING A TIRE MOLD SEGMENT

This application claims benefit of U.S. Provisional Patent Application Ser. No. 62/932,081, filed on Nov. 7, 2019. The teachings of U.S. Provisional Patent Application Ser. No. 62/932,081 are incorporated herein by reference in their entirety.

FIELD OF THE INVENTION

This invention relates to a 3D-printed tire segment model having a tread portion comprising a plurality of grooves, ribs and/or tread blocks, and a plurality of blades extending out of the ribs and/or tread blocks, wherein the model is made of a 3D-printed polymer. Moreover, the present invention is drawn to a method of making a tire mold segment, including the step of 3D-printing the tire segment model with a polymer.

BACKGROUND OF THE INVENTION

Manufacturing of tire mold segments for molding tires is a crucial task in the tire manufacturing process. Molds must fully meet specifications as typically thousands of tires are made with a single mold. For these reasons, mold manufacturing is carried out with great care to attain the needed geometric specifications and the required level of tolerance. Making such molds typically involves a significant turn-around time to ensure the desired accuracy and because a high level of manual labor is normally required. Because the process of mold manufacturing is very time consuming, there is a desire to improve such processes and make them more time efficient and to accordingly reduce manufacturing cost. Recently, it has been suggested to directly print metal molds for tires by melting powder metal material. However, it has been found that such processes are expensive and do not meet in all cases accuracy and quality expectations. Also, fine structures are often not as reproducible as desired. Moreover, advanced automated milling machines have been suggested for some of the process steps in mold manufacturing. However, such milling processes often have the disadvantage of limiting the tire tread design to certain shapes because milling tools frequently cannot create all complex three-dimensional (3D) structures which may be desired in tire molds.

Techniques that involve fabricating parts or assemblies in an additive or layer-by-layer fashion are termed "additive manufacturing" (AM) and are also commonly referred to by the general public as "3-D printing". There are multiple AM technologies including material extrusion, material jetting, binder jetting, vat photo polymerization, sheet lamination, powder bed fusion and directed energy deposition. The most widely used of these AM technologies is based on material extrusion. While some variations exist, this technology generally involves feeding a thermoplastic polymer in the form of a continuous filament into a heated nozzle, where the thermoplastic filament becomes a viscous melt and can be therefore extruded. The thermoplastic used can be typically acrylonitrile-butadiene-styrene (ABS), poly (lactic acid) (PLA), polycarbonate (PC), polystyrene (PS), high impact polystyrene (HIPS), polycaprolactone (PCL), and polyamide as well as some other polymeric materials with ABS and PLA being the most common. In any case, the 3-dimensional motion of the nozzle or the extruder assembly is precisely controlled by step motors and computer aided manufacturing (CAM) software. The first layer of the object is deposited on a build substrate, whereas additional layers are sequentially deposited and fused (or partially fused) to the previous layer by solidification due to a drop in temperature. The process continues until a 3-dimensional part is fully constructed.

SUMMARY OF THE INVENTION

A first object of the present invention may be to provide an advanced tire model segment which may be used in tire mold segment manufacturing.

Another object of the present invention may be to provide an advance tire model segment which can help to save at least one manufacturing step during the process of mold segment manufacturing.

Yet another object of the present invention may be to support improved time and/or cost efficiency in mold manufacturing. In other words, it is an object of this invention to reduce the overall manufacturing cost and turnaround time need to make a desired tire mold.

Thus, in a first aspect of the invention, a 3D-printed tire segment model having a tread portion is provided, the tread portion comprising a plurality of grooves, ribs and/or tread blocks, and a plurality of blades extending out of one or more of the ribs and/or tread blocks, wherein the ribs and/or tread blocks as well as the blades are made of 3D-printed polymer. Such a 3D-printed tire segment model is special in the sense that it is made of 3D-printed polymer including 3D printed polymer blades extending (radially) out of the ribs and/or grooves. For example, this may involve the advantage of avoiding a step of equipping a tire segment model with blades after the creation of a tire segment model including sipes to receive blades. According to the invention, the tire segment model already includes 3D-printed blades which renders the multi-step process of making a tire mold more cost and time efficient.

In one embodiment of the present invention, one or more of the blades have essentially a zig-zag shape. Thus, the blades may have a shape complementary to the shape of sipes in a winter or all-season tire.

In another embodiment, multiple of said blades extend at least 3 mm out of one or more of the ribs and/or tread blocks.

In another embodiment, said blades extend from the surface of the ribs and/or tread blocks essentially in a radial direction. Preferably, the blades extend between 3 mm and 10 mm out of the radially outermost surface of the ribs and/or tread blocks.

In yet another embodiment, a plurality or even the majority of said blades extends essentially along the axial direction in a zig-zag shape.

In yet another embodiment, said blades are integrally formed with the ribs and/or tread blocks. In other words, they are printed in one piece together with the tread of the tire segment model.

In still another embodiment, the tire segment model further comprises a three-dimensional pattern or structures on the side walls of at least some of the ribs and/or the tread blocks. For instance, such a pattern could for example be a texture. Such patterns or textures could be present on groove bottoms, at sidewalls of ribs and/or tread blocks or also on the radial top of grooves and/or tread blocks. While it may be technically easier to provide such patterns on the bottom of grooves, it is difficult to provide such patterns on sidewalls of ribs or tread blocks, in particular with conventional milling techniques.

In still another embodiment, the three-dimensional pattern or texture has a height, measured perpendicular to the side wall or surface on which it is provided, ranging from 0.1 mm to 1 mm, preferably to 0.5 mm. With other techniques it is difficult to provide patterns or structures on the sidewalls.

In still another embodiment, the tire segment model has a 3D-printed supporting structure extending at least below the tread. The supporting structure may have the purpose of giving the segment model a better mechanical stability and ease handling of the model. For instance, the supporting structure may be a closed cell structure or a three-dimensional grid. Such structures can provide relatively high stability requiring a limited amount of material at limited weight. In addition, or alternatively, a support structure can also beneficially serve as a substrate or base on which the tread pattern of the model is printed. Thus, the support structure could be 3D-printed or otherwise manufactured, such as by molded. Providing a support structure before printing the tread could further decrease the time required for printing the tire segment model.

In still another embodiment, the polymer is chosen from a group of thermoplastic materials. The thermoplastic material used is typically an acrylonitrile-butadiene-styrene triblock polymer (ABS), an acrylonitrile-styrene-acrylonitrile triblock polymer (ASA), a poly(lactic acid) (PLA), a polycarbonate (PC), a polystyrene (PS), a high impact polystyrene (HIPS), a polycaprolactone (PCL), or a polyamide (nylon). Blends of acrylonitrile-butadiene-styrene triblock polymers (ABS) and polycarbonates (PC) can be used in applications where a high level of strength and durability is required. Such blends are typically comprised of 35 weight percent to 65 weight percent of the ABS and 35 weight percent to 65 weight percent of the PC. To attain a higher level of strength and durability glass filled PC can also be used. The polyamide used will typically be selected from nylon-6,6, nylon-4,6, nylon-6,9, nylon-6,10, nylon-6,12, nylon-6, nylon-11, or nylon 12. Glass filled nylons, such as glass filled nylon-12, can also be used.

ABS has the advantage of good overall mechanical properties; however it suffers from relatively large volumetric shrinkage and the generation of unpleasant odors. Accordingly, the generation of potentially toxic degradation products during printing makes ABS a less suitable option for used in printers that do not have a heated build envelope and an effective mechanism to eliminate the odor and toxic degradation products. PLA, on the other hand, has less volumetric shrinkage which allows it to be printed properly even without a heated build envelope. It generates no unpleasant odor during printing, and the main degradation product is lactic acid which poses minimal health risk to personnel. However, PLA suffers from a number of drawbacks, including poor impact strength and a low softening temperature.

In general, multiple known 3D printing (or in other words additive manufacturing) methods and equipment could be used. However, in a preferred embodiment, stereolithography (also known as SL or SLA) may be used. SLA is a photopolymerization method, typically involving a cure of a photopolymer by means of a laser. One advantage of using this technology in an embodiment of the present invention is that this method allows for achieving high quality including an advanced accuracy and finish, all at relatively high speed.

In a second aspect of the invention, a method for manufacturing a tire mold segment is provided, the method comprising the step of 3D-printing a tire segment model with a polymer, the model having a tread portion with a plurality of grooves, ribs and/or tread blocks, and blades extending out of the ribs and/or tread blocks.

In one embodiment, the method may comprise one or more of the following steps:
i) forming a negative cast (e.g. made of rubber material) from the 3D-printed tire segment model, the negative cast comprising slots complementary to the blades of the 3D-printed tire segment model;
ii) adding metal blades (e.g. made of steel) into the slots of the negative cast (preferably the blades have the same lateral cross section as the blades of the tire segment model);
iii) forming a positive cast (e.g. made of plaster or a heat resistant material having preferably a melting point above 670° C.) from the negative cast, the positive cast comprising the metal blades of the negative cast (the metal blades may be pulled with the positive cast out of the negative cast); and
iv) using the positive cast to form the tire mold segment (e.g. casted aluminum) including the metal blades of the negative cast (wherein the positive cast may be destroyed for removal from the tire mold segment).

In another preferred embodiment, the method further comprises the step of computer modelling of the tire segment model before 3D-printing the tire segment model. This computer model may be used as a basis for the step of 3D-printing.

Multiple mold segments may be combined with one another to a tire mold for molding a tire. Mold segments as such are known to the person skilled in the art. In other words, multiple mold segments can be segments of a ring which are connected in a circumferential direction to form together a closed ring.

Whenever, reference is made herein to the radial, axial and circumferential direction, this shall stand for the same directions as commonly used for the description of a tire. In particular, when reference is made to one or more of such directions in relation to a tire model segment, this shall be understood in the same manner as for a tire segment.

Blades as mentioned herein include winter blades (corresponding to sipes in a tire tread, in particular in the ribs or tread blocks) but also blades for all-season or summer tires. Such blades create also sipes in the tire tread. While most blades for creating sipes in a winter tire may have a zig-zag shape along their axial length, sipes for summer tires have typically straight shapes, round shapes or combinations thereof.

The features mentioned in the method may be further combined with elements of one or more of the other aspects of the invention or their embodiments as described herein. Also, multiple features of the preferred embodiments mentioned herein may be combined with one another.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE INVENTION

Figure 1:
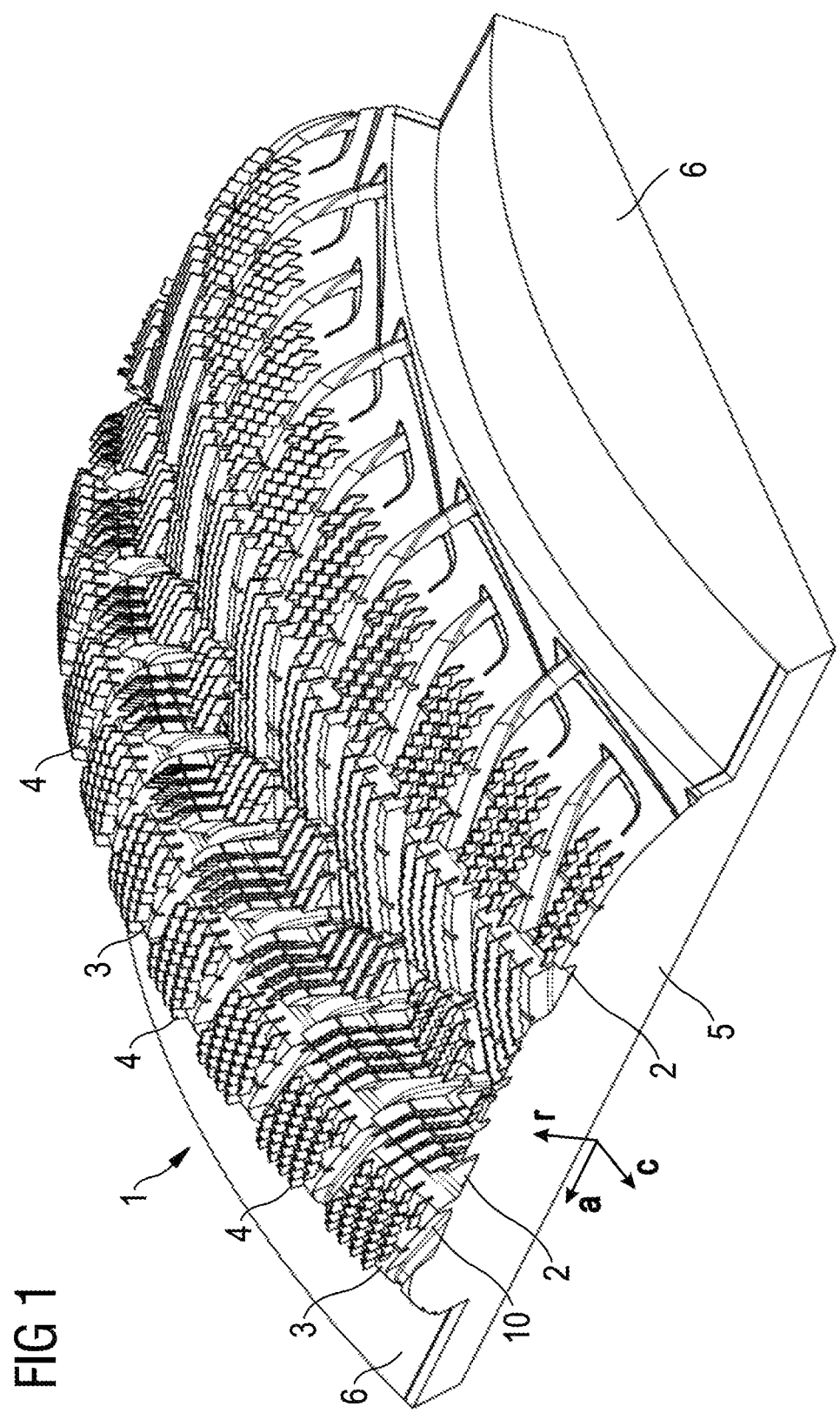
FIG. 1 shows a schematic perspective view of a tire segment model in accordance with a preferred embodiment of the present invention.

FIG. 1 shows a schematic perspective view of a tire segment model 1 in accordance with a preferred embodiment of the present invention. The tire segment model 1 comprises a tread portion 10 having a plurality of grooves 2 and a plurality of tread blocks 3. The tire segment model 1 further comprises blades 4 which extend from the radially outer surface of the tread blocks 3. The tread 10 may be arranged on a support portion 5 which may have also extensions 6 on both lateral side of the tread 10, which may facilitate handling of the tire segment model 1. The axial direction a, the circumferential direction c and the radial direction r are indicated, in the same sense as common for the description of tire symmetries. In accordance with this invention, the tire segment model 1 is made completely by 3D-printed.

Figure 2:
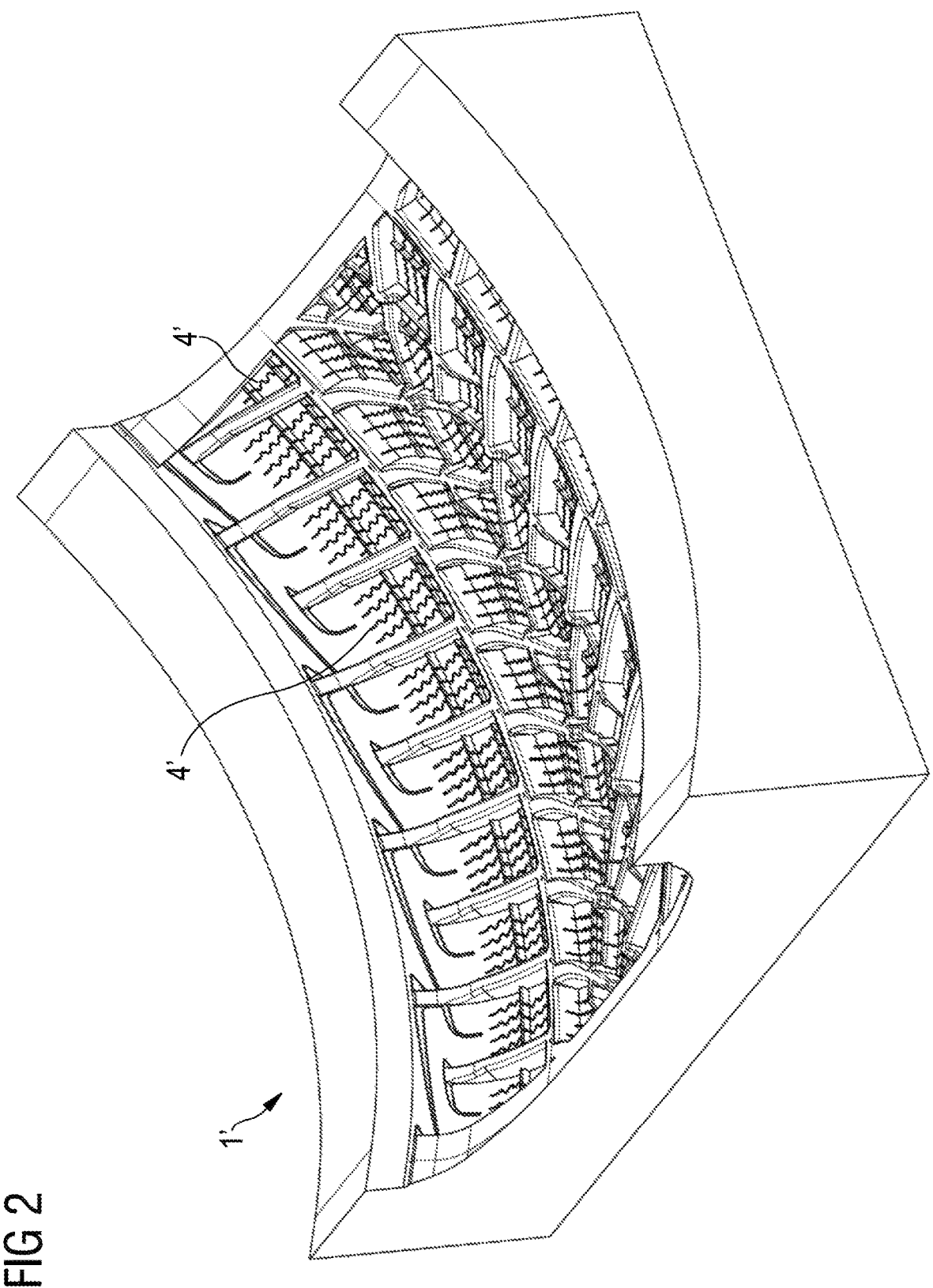
FIG. 2 shows a schematic perspective view of a negative rubber cast segment created by the tire segment model of FIG. 1.

FIG. 2 shows a negative cast 1' made of rubber material and formed with the positive tire tread segment model 1 of FIG. 1. As visible in FIG. 2, the negative cast 1' has a shape complementary that of the earlier discussed 3D-printed polymer tire tread segment model 1. In particular the 3D-printed blades 4 of the 3D-printed tire tread segment model 1 have created sipes 4', or in other words slots, in the negative cast 1'. In further steps it is possible to insert metal blades into said sipes 4' of the negative rubber cast 1' (not shown in FIG. 2). Once the negative rubber cast 1' has been equipped with all blades extending out of the sipes 4', another positive cast, preferably made of plaster, may be formed by means of the negative cast 1' equipped with the metal blades. The metal blades would then be bound in the plaster and after hardening of the plaster cast, the flexible negative rubber cast 1' may be removed. Reference is also made in this context to FIG. 3 in which a plurality of potential manufacturing steps are delineated. The positive plaster cast including the metal blades could be used to form an aluminum cast which would contain the metal blades. After removing, respectively destroying the plaster, the negative aluminum cast including the metal blades originally inserted into the rubber cast 1' remains. Such an aluminum cast can then be used to mold a final tire segment.

Figure 3:
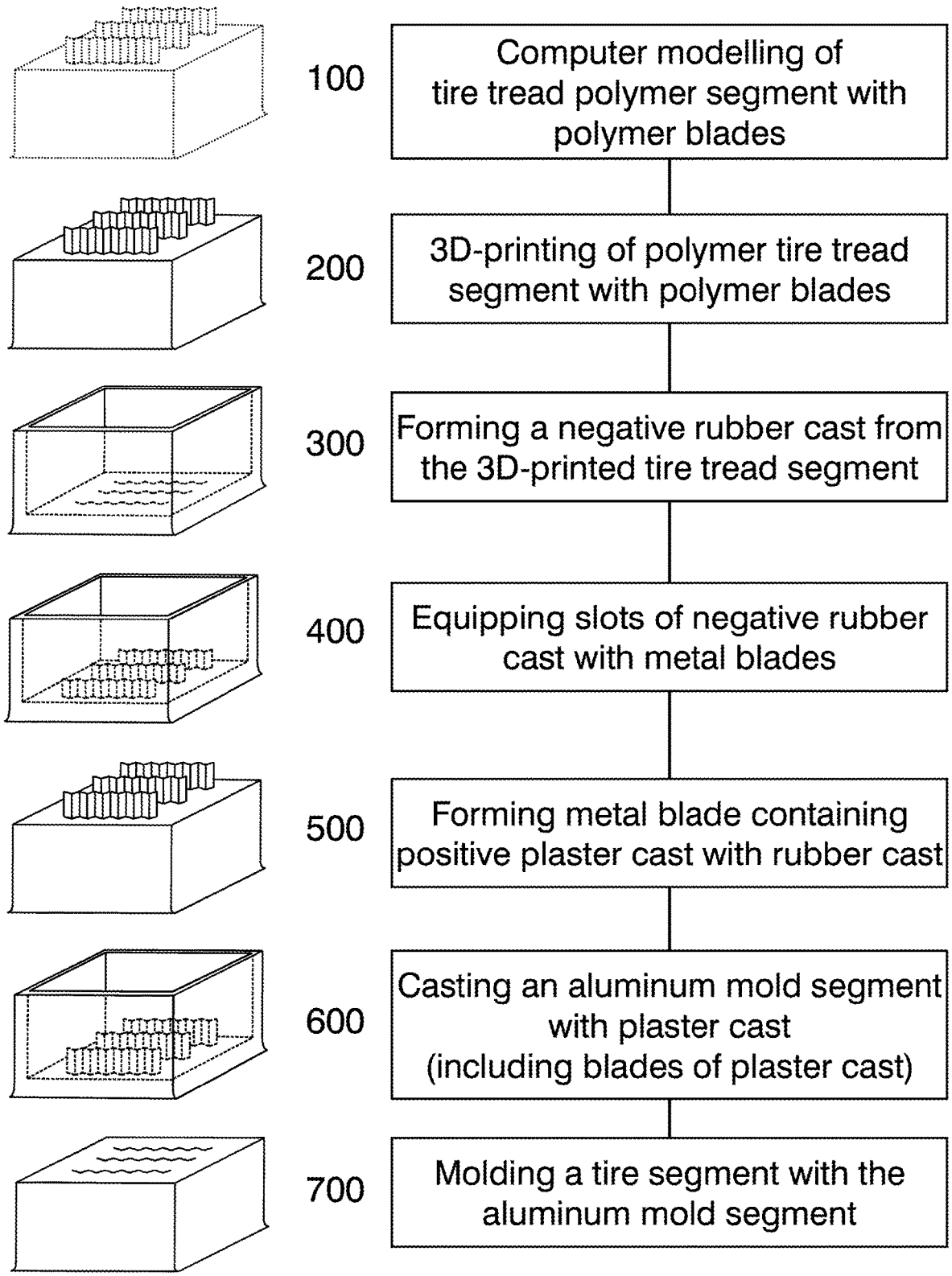
FIG. 3 shows a method of manufacturing a tire segment in accordance with a preferred embodiment of the present invention.

FIG. 3 discloses a method of manufacturing a tire mold segment in accordance with a preferred embodiment of the present invention.

In a preferred first step 100, a tire segment model is modelled with a computer. This tire segment model comprises already blades. For, instance the tire segment model could have the shape of the tire segment model 1 as shown in FIG. 1. For the sake of a better comprehensibility, FIG. 3 shows only one schematic tread block beside each depicted method step. However, the depicted tread block shall not be understood in a limiting sense.

In a further preferred step 200, a polymer tire tread segment is printed with a 3D-printing technique, preferably based on the computer model of step 100. Preferably, polymer blades are integrally formed with and/or printed on the tread blocks of the tread.

In still a further preferred method step 300, a negative rubber cast (or in other words mold) is formed (or molded) from the 3D-printed tire tread segment. Instead of rubber, one could for instance also use silicone.

In a preferred fourth step 400, slots formed by the polymer blades of the polymer tread segment in the negative cast are equipped with metal blades (e.g. made of steel). In other words, metal blades (also called production blades) with essentially the same lateral cross section as the slots obtained in step 300 are inserted into said slots.

In a further preferred fifth step 500, a positive plaster cast is created (or cast) by means of the negative cast obtained in steps 300 and 400. In one embodiment of this invention, this plaster cast may be dried at room temperature or a higher temperature.

In a further preferred step 600, the positive plaster cast, such as obtained in step 500, can be used to produce or cast an aluminum mold segment (negative mold). The blades of the plaster cast of step 500 are then integrated or contained in the aluminum mold segment and extend out of the surface of the aluminum mold segment, essentially in an (inner) radial direction).

In yet another preferred step 700, and after an optional cleaning and/or sand-blasting step of the aluminum mold segment, a tire segment (i.e. again a positive shape) can be molded with the aluminum mold segment.

Typically, a plurality of mold segments may be combined to form a circumferentially closed tire mold for molding the tire.

While certain representative embodiments and details have been shown for the purpose of illustrating the subject invention, it will be apparent to those skilled in this art that various changes and modifications can be made therein without departing from the scope of the subject invention.

What is claimed is:

1. A 3D-printed tire segment model comprising (1) a supporting structure; and (2) a tread portion having a plurality of grooves; ribs and/or tread blocks; and a plurality of blades extending between 3 mm and 10 mm radially out of the radially outermost surface of one or more of the ribs and/or the tread blocks; wherein the ribs and/or the tread blocks, as well as the blades are comprised of a polymer, wherein the tire segment model can be connected with additional tire segment models to form a closed ring, wherein the supporting structure is comprised of a thermoplastic material selected from the group consisting of polylactic acids, polycarbonates, polystyrenes, high impact polystyrenes, and polycaprolactones.

2. The 3D-printed tire segment model of claim 1, wherein one or more of the blades have a zig-zag shape.

3. The 3D-printed tire segment model of claim 1, wherein said blades extend from the surface of the ribs and/or the tread blocks in a radial direction.

4. The 3D-printed tire segment model of claim 1, wherein a majority of the blades extend along an axial direction in a zig-zag shape.

5. The 3D-printed tire segment model of claim 1, wherein said blades are integrally formed with the ribs and/or the tread blocks.

6. The 3D-printed tire segment model of claim 1, further comprising a three-dimensional pattern at least on the side walls of at least some of the ribs and/or the tread blocks.

7. The 3D-printed tire segment model of claim 6, wherein the three-dimensional pattern has a height, measured perpendicular to the side wall which is within the range of 0.1 mm to 1 mm.

8. The 3D-printed tire segment model of claim 1, wherein the tire segment model has a 3D-printed supporting structure extending at least below the tread to support the tread.

9. The 3D-printed tire segment model of claim 8, wherein the supporting structure has extensions on both lateral sides of the tread.

10. The 3D-printed tire segment model of claim 8, wherein the supporting structure is a three-dimensional grid.

11. A 3D-printed tire segment model comprising (1) a supporting structure; and (2) a tread portion having a plurality of grooves; ribs and/or tread blocks; and a plurality of blades extending between 3 mm and 10 mm radially out of the radially outermost surface of one or more of the ribs and/or the tread blocks; wherein the ribs and/or the tread blocks, as well as the blades are comprised of a polymer selected from the group consisting of polylactic acids, polycarbonates, polystyrenes, high impact polystyrenes, and polycaprolactones; wherein the supporting structure has extensions on both lateral sides of the tread.

12. The 3D-printed tire segment model of claim 11, wherein the supporting structure is a three-dimensional grid.

13. The 3D-printed tire segment model of claim 11, wherein the supporting structure is comprised of a thermoplastic material selected from the group consisting of polystyrene, high impact polystyrene, and polycaprolactone.

14. The 3D-printed tire segment model of claim 11, wherein the supporting structure is comprised of a poly (lactic acid).

15. The 3D-printed tire segment model of claim 11, wherein the supporting structure is comprised of a polycaprolactone.

16. The 3D-printed tire segment model of claim 1, wherein the polymer is poly(lactic acid).

17. The 3D-printed tire segment model of claim 1, wherein the polymer is a blend which is comprised of 35 weight percent to 65 weight percent of an acrylonitrile-butadiene-styrene triblock polymer and from 35 weight percent to 65 weight percent of a glass filled polycarbonate.

\* \* \* \* \*